Patented June 2, 1931

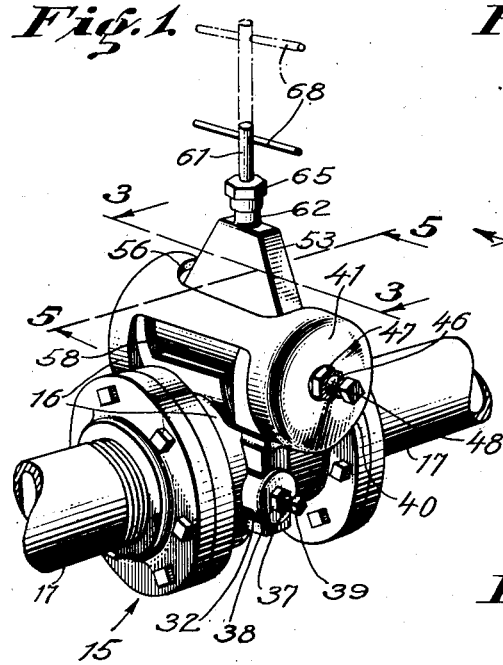
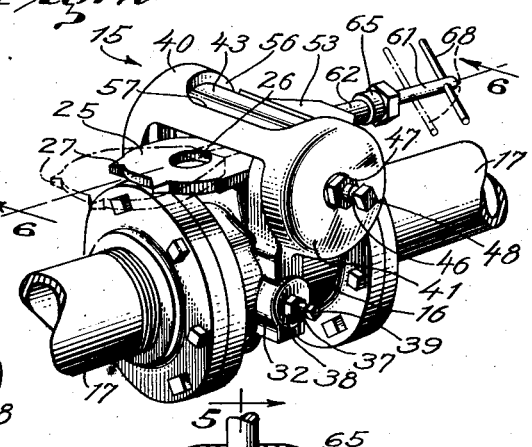

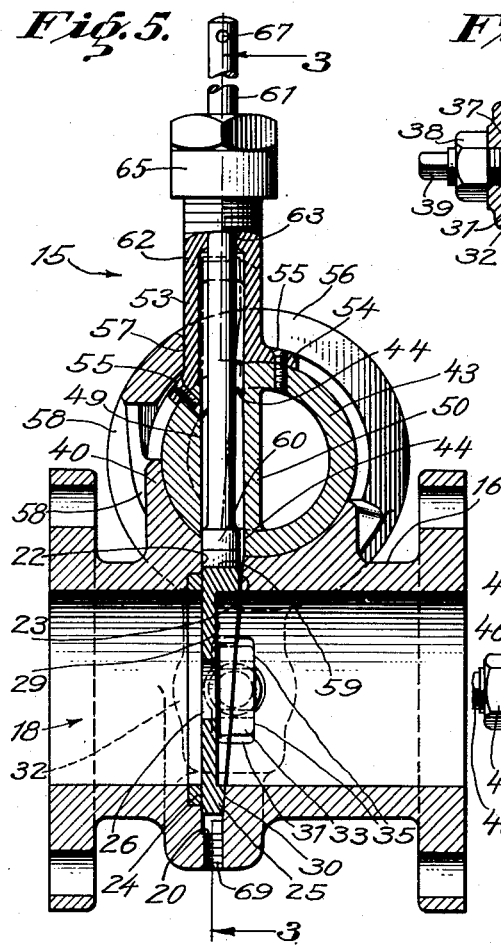
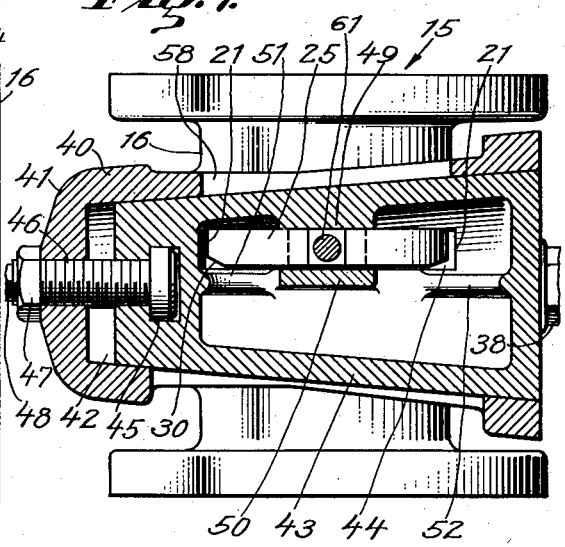

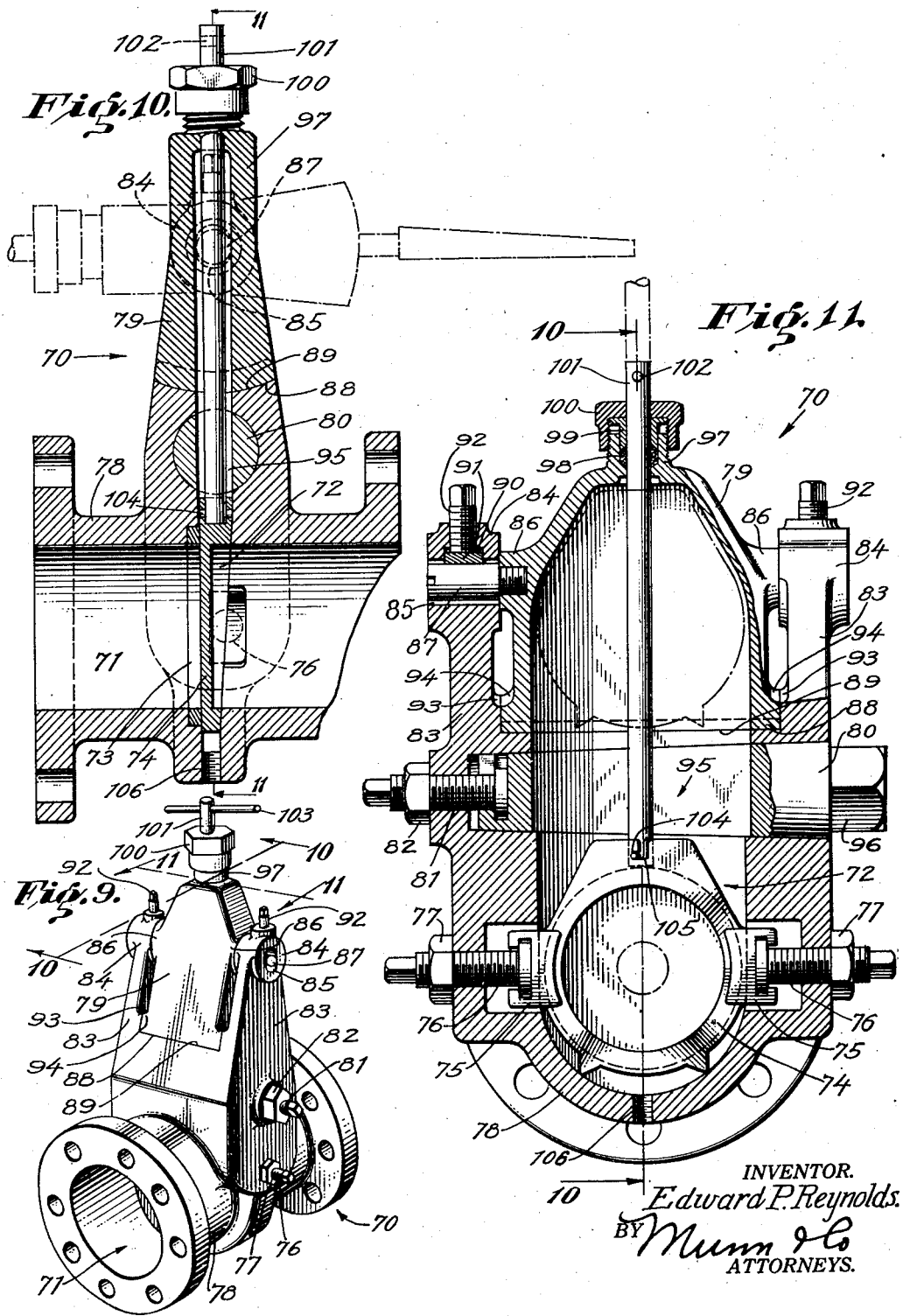

1,808,715

UNITED STATES PATENT OFFICE

EDWARD P. REYNOLDS, OF LOS ANGELES, CALIFORNIA

SLIDING VALVE

Application filed February 27, 1929. Serial No. 342,977.

My invention relates to valves in which slidable valve members are arranged so as to obstruct the flow of fluid through the valve bodies when the valve members are in their closed positions, and it may thus be applied either to gate valves, in which the valve members in their closed positions entirely prevent a fluid from passing through the valve bodies, or to orifice valves, in which the valve members in their closed positions are adapted to allow a fluid to flow therethrough and at the same time to serve as means for measuring the flow of the fluid.

Where a valve of the aforementioned character, particularly an orifice valve, is used, it is occasionally required to withdraw the slidable valve member from the valve body and to insert another valve member in its place. In the majority of such valves it has hitherto been impossible to effect the withdrawal of the slidable valve member from, or the insertion of it into, the valve body, without interrupting the flow of fluid through the pipe line in which the valve has been installed. Attempts at preventing the interruption of the flow of fluid by devices for by-passing the fluid through the pipe line have therefore been made in the prior art. Such by-pass devices, however, are too expensive and occupy too much space to be practical. The prior art also discloses the valve body of an orifice valve as provided with a lateral chamber into which the slidable valve member may be withdrawn or inserted.

In this instance the valve body is shown as flanged at the outer end of the chamber, while a flanged bonnet, which is removably secured to the flange of the valve body by a number of studs and nuts, serves as means for closing the outer end of the chamber. Even a new valve of this construction is defective in the respect that it involves the slow operation of screwing the nuts upon the studs in order to properly seal the outer end of the chamber after the slidable valve member has been inserted into the valve body, and, when the valve has been exposed to the action of the elements for only a short time, corrosion will cause the nuts to stick to the studs so that great difficulty is experienced in removing the bonnet whenever the removal of the slidable valve member from the valve body is required.

One object of my invention is to provide a valve of the aforementioned character with a housing, which is adapted to receive the slidable valve member therein and is rotatably mounted in the valve body so that the housing may be swung to a position in which the housing allows the valve member to be slid therefrom to its flow-obstructing position in the fluid passage within the valve body or from the flow-obstructing position into the housing, and that the housing may be swung to a position in which the slidable valve member is allowed to be directly inserted from the outside of the valve body into, or directly removed from, the valve body, without causing or necessitating the removal from the housing of the outer closing means therefor.

Another object of my invention is to arrange a second valve member in a valve of the aforementioned character, in addition to the rotatable housing and the slidable valve member, so that the second valve member is operable from the outside of the valve body and is adapted to prevent communication between the housing and the fluid passage in the valve body when the second valve member is in its closed position, and to provide the second valve member with an opening through which the slidable valve member is allowed to pass to and from the housing.

A further object of my invention is, in addition to the rotatable housing and the valve members in a valve of the aforementioned character, to provide means for effecting the sliding movements of the slidable valve member and to arrange such means so as to be operable from the outside of the valve body.

A still further object of my invention is to provide means for adjustably holding the slidable valve member in a valve of the aforementioned character in engagement with its seat and to provide means for locking the adjustable means so as to prevent the adjustment from being accidentally changed.

With the above mentioned objects and with other objects in view, the invention consists in the novel construction and combination of parts hereinafter described, illustrated in the accompanying drawings, and set forth in the appended claims, it being understood that various changes in the form, proportion, size and minor details of construction within the scope of the claims may be made without departing from the spirit, or without sacrificing any of the advantages, of the invention.

In the drawings:

Fig. 1 is a perspective view of a preferred form of the sliding valve of my invention, and of a portion of the pipe line in which the valve is installed, the rotatable housing in the valve being secured to the rotatable valve member and being shown as swung therewith to a position in which the slidable valve member is allowed to be slid to its position for obstructing the flow of fluid through the valve body, and the means for operating the slidable valve member being shown in full lines as pushed so as to hold the slidable valve member in the flow-obstructing position, and in dot-and-dash lines as pulled so as to hold the slidable valve member withdrawn into the housing;

Fig. 2 is a perspective view, similar to Fig. 1, but showing the rotatable housing, with the slidable valve member and its operating means, as swung to a position in which the housing is virtually parallel with the pipe line, and indicating in full lines how the slidable valve member is held by its operating means partly inserted into the housing, and indicating in dot-and-dash lines the slidable valve member as held by its operating means in a position either preparatory to the insertion of the valve member into the housing or preparatory to the removal of the valve member from the valve body;

Fig. 3 is an enlarged section of the valve taken in a plane indicated by the line 3—3 in Figs. 1 and 5;

Fig. 4 is a perspective view of the slidable valve member used in connection with the preferred form of valve shown in Figs. 1 and 2;

Fig. 5 is an enlarged section taken in a plane indicated by the line 5—5 in Figs. 1 and 3;

Fig. 6 is an enlarged, broken section taken in a plane indicated by the line 6—6 in Fig. 2, dot-and-dash lines indicating the slidable valve member as being held by the operating means therefor in the position in which it is adapted to be inserted into, or removed from, the housing;

Fig. 7 is a section taken in a plane indicated by the line 7—7 in Fig. 3;

Fig. 8 is a broken section taken in a plane indicated by the line 8—8 in Fig. 3, the view showing how the slidable valve member is adjustably held in engagement with its seat;

Fig. 9 is a perspective view of another form of sliding valve, the rotatable housing being swung so as to allow the slidable valve member to assume its flow-obstructing position in the valve body;

Fig. 10 is a section taken in a plane indicated by the line 10—10 in Figs. 9 and 11, dot-and-dash lines indicating the housing as swung to a position, in which the slidable valve member is allowed to be inserted into the housing from the outside of the valve body or to be removed from the valve body, and also indicating the slidable valve member as being held by the operating means therefor in the position in which it is adapted to be inserted into, or to be removed from, the housing; and Fig. 11 is a view taken partly sectionally in a plane indicated by the line 11—11 in Figs. 9 and 10.

In the preferred embodiment of my invention, as illustrated in Figs. 1 to 8, the sliding valve is indicated in its entirety by the numeral 15. This sliding valve comprises a body 16, which is suitably flanged at its ends so that the valve is adapted to be installed in a pipe line 17, as shown in Figs. 1 and 2. In order to allow fluid to flow through the valve, the body 16 has formed longitudinally therein a passage 18. Transversely to the fluid passage the valve body is also provided with a channel 19, which may be formed by a curved bottom 20 at the lower portion of the valve body and by a pair of opposing walls 21 and other walls 22 and 23, the walls 21, in fact, being continuations of the bottom 20 and extending upward in the valve body a certain distance from the bottom, while the wall 22, like the walls 21, extends from the bottom vertically upward or in a plane at right angles to the axis of the fluid passage, and the opposing wall 23 extends in a plane oblique to the wall 22, so that cross-sectionally the channel is tapered. An annular recess, concentric with the passage 18, is also formed in the wall 22, and in this recess is placed an annular element 24 of a suitable material, so that the element is adapted to serve as seating means for a valve member 25, which is mounted in the channel so as to be adapted to slide to and from a position for obstructing the flow of fluid through the passage and to be seated with one side against the element 24 when the valve member is in its flow-obstructing position, as shown in Figs. 3, 5 and 8.

The valve member 25 may be made so that, when it is in its closed position, it entirely prevents fluid from flowing through the valve body, or it may have an orifice 26 therein, so that, in its seated position, it obstructs the flow of fluid through the passage 18 sufficiently for allowing the flow to be measured by means of the orifice. Preferably, the valve member is shaped so as to be guided by the walls 22 and 23 to its closed position, and on the rim of that end portion which is contiguous to the seat portion of the valve member, the latter is also provided with lugs 27, which further assist in guiding the valve member to its closed position and at the same time serve as means for engaging the curved bottom 20 and thereby stopping the closing movement of the valve member, so that the orifice is virtually concentric with the fluid passage 18 when the valve member is in its closed position. On both sides of its rim the valve member has also formed projections 28, which are adapted to fit between the walls 21 of the channel in order to assure a free sliding movement of the valve member to or from its closed position in the valve body. For the purpose of decreasing the weight of the valve member and thereby facilitating the operation of the valve member, a recess 29 is formed concentrically with the orifice 26 in the valve member on the side opposite to the seat-engaging portion of the valve member. On the same side the valve member is provided with faces 30, which are bevelled from the recess to the rim of the projections 28.

At those portions of the respective walls 21 which engage the projections 28 when the valve member is in its closed position, the channel 19 merges into respective chambers 31. Each of these chambers is widened from the wall 22 of the channel and extends into a boss 32 formed on the valve body, so that each chamber is thereby adapted to hold slidably therein a wedge 33. As shown at 34, each wedge is bevelled on one side and at its inner end. The wedge is thereby adapted to engage a pair of spaced guides 35 formed in the respective chamber 31, so that, when the wedge is moved sufficiently inward, it will cause the bevelled face 34 of the wedge and the respective bevelled face 30 of the valve member to be in a position for contacting each other, and that thus, when the valve member is in its closed position, it will be held in fluid-tight engagement with the seating element 24.

In its outer end portion each wedge 33 has preferably a transverse T slot 36, adapted to receive in its cross portion the head of a stud 37, the stem of which extends with clearance through the slot and is adapted to be screwed through the respective boss 32, so that the studs serve as adjustable means for causing the wedges to hold the valve member in engagement with its seat, while nuts 38, screwed on the stems of the respective studs against the outsides of the bosses, serve as means for locking the studs in their adjusted positions. The studs are preferably provided with squared ends 39, which can be conveniently gripped by a wrench or other suitable tool in order to facilitate the turning of the studs to or from their adjusted positions.

At the outer end of the channel 19 the valve body 16 forms a shell 40, which is transverse to the fluid passage 18 and is closed at one end by a wall 41. The shell has therein longitudinally a conical valve opening 42, the narrow end of which is at the end wall 41 of the shell. This valve opening communicates with the channel 19 and has a valve member 43 rotatably fitted therein. A slot 44 is formed longitudinally in the valve member 43 so as to allow the valve member 25 to slide therethrough to and from its closed position in the valve body. Preferably, the valve member 43 has formed transversely therein, and near to the narrow end thereof, a T slot 45, and the threaded stem of a headed stud 46 is screwed co-axially with the valve member through the end wall 41 of the shell 40, while the head of the stud engages the cross portion of the T slot, so that, by the proper adjustment of the stud, the valve member is held in a fluid-tight engagement with the conical wall of the valve opening 42. A nut 47, screwed against the outside of the wall 41, serves to lock the stud in its adjusted position and thereby to assure the proper functioning of the valve member 43, and the stud may be provided with a square outer end 48 in order to facilitate the turning of the stud to or from its adjusted position.

For the purpose of making the valve member 43 as light as possible, the interior of the valve member at the slot 44 is preferably hollow, so that, in fact, the slot appears as two slots formed opposite to, and in registration with, each other in the conical wall of the valve member, ribs 49, 50, 51 and 52 being provided in the interior of the valve member. Of these ribs, the ribs 49 and 50 are formed opposite to each other approximately medially of the slots 44 and bound the opposite longitudinal edges of the slots, so that the ribs, in addition to being adapted to serve as means for reinforcing the valve member 43 at its median portion, may also serve as means for guiding the valve member 25 through the valve member 43, and the ribs 51 and 52 are formed as arches approximately in an axial plane in parallelism with the ribs 49 and 50 in order to assist the ribs 49 and 50 in reinforcing the valve member 43 both centrally and at the ends of the slots 44.

A housing 53 is at its mouth provided with a flange 54, fitting the outside of the valve member 43, and the housing is secured to the valve member by any suitable means, for instance, by screws 55, which extend through the flange and are screwed into the valve member, so that the housing has a fluid-tight connection with the valve member and is rotatable therewith. This housing is adapted to receive the valve member 25 therein and registers with the slots 44 so that, in the open position of the valve member 43, the valve member 25 may be slid from the housing to its flow-obstructing position in the channel 19, as shown in full lines in Figs. 3, 5 and 8, or it may be slid from the flow-obstructing position through the valve member 43 into the housing, as suggested by dot-and-dash lines in Figs. 3 and 5, and that, in the closed position of the valve member 43, the valve member 25 may be inserted into the housing from the outside of the valve body 16 or may be removed therefrom, as suggested respectively by full lines and by dot-and-dash lines in Figs. 2 and 6. In order to allow the housing to rotate with the valve member 43, the valve body has laterally in its shell a cut-out portion 56, thereby at the same time forming a face 57, against which the housing abuts when the valve member 43 is turned to its open position, and, in order to allow the insertion into, and the removal of the valve member 25 from, the valve body, the shell has also laterally a cut-out proportion 58. In the construction shown, the slot 44 is arranged so that, when the valve member 43 is turned to its closed position, the housing may abut the flanged end of the valve body, as shown in Fig. 6.

Preferably, the valve member 25 has in its end portion towards the housing 53 a T slot 59, and a shoe 60, which in one side elevation, as shown in Fig. 3, is T-shaped and fits in the T slot, is secured to the inner end of a rod 61. Opposite to its flanged end, the housing terminates in a neck 62. This neck is threaded at its end and has therein a bore 63, substantially in registration with the center of the flanged mouth of the housing. The rod 61 fits rotatably and slidably within a portion of the bore and is adapted to extend through the bore, so that, by merely a quarter turn of the rod, the shoe 60 may be caused to operatively engage the T slot 59 and that thus the rod may serve as means for effecting the sliding movements of the valve member 25, or that the shoe may be disengaged from the valve member whenever the removal of the latter from the valve body 16 is required.

Beyond its rod-engaging portion, the bore 63 is enlarged so as to form a stuffing box around the rod 61, and a packing material 64 is placed in the stuffing box, while a cap 65, through which the rod extends, is screwed upon the threaded end of the neck 62. A gland 66 is placed in the stuffing box so as to be actuated by the cap in order to compress the packing and thereby to prevent leakage of fluid from the housing around the rod 61.

At its outer end portion the rod 61 has therethrough an opening 67, adapted to receive loosely therein a pin 68. The pin is thus easily inserted into the rod and easily removed therefrom, and serves as an operating handle for the rod.

In practice, the studs 37 may be adjusted so that the wedges 33 bear against the valve member 25 with a force only sufficient for holding the valve member in a fluid-tight engagement with the seating element 24, and that thus the valve member may be easily moved by an operator from or to its closed position merely by taking hold of the handle 68. However, when it is not required to remove a valve member 25 for a long period of time, the studs 37 may be adjusted so that the wedges 33 press harder against the valve member. Before the valve member 25 is moved it may be advantageous to loosen the adjusting studs 37 so that the wedges are out of contacting position relative to the valve member 25, since then there is the least frictional resistance and therefore the valve member can be moved with the least difficulty to or from its closed position in the valve body.

When the valve member 25 is to be removed from the valve body, the valve member is thus first slid into the housing 53 to the position shown in dot-and-dash lines in Figs. 3 and 5, the positions, which the rod 61 and the handle 68 then assume, being indicated by dot-and-dash lines in Fig. 1. The adjusting stud 46 being sufficiently loosened, the operator turns the valve member 43, so that the housing assumes the position shown in full lines in Figs. 2 and 6, and finally pushes the handle to its dot-and-dash line position, indicated in Fig. 2, and therewith also the valve member 25 to its dot-and-dash line position, indicated in Figs. 2 and 6. After a quarter turn of the rod, the slidable valve member is easily disconnected from the rod 61. When a valve member 25 is to be inserted into, and moved to its closed position in, the valve body, the steps for the removal of the valve member, of course, are reversed.

A threaded opening 69, communicating with the channel 19, is preferably formed in the valve body 16 in order to facilitate the draining of foreign substances from the valve 15, such as sand or grit, which may accumulate therein. When the valve is in operation, this opening may be closed by a suitable plug, not shown.

In another embodiment of my invention, illustrated in Figs. 9, 10 and 11, the sliding valve as a whole is indicated by the numeral 130

70. Such portions of the valve 70 as the fluid passage 71, the channel 72, the seating element 73, the slidable valve member 74, the wedges 75, the adjusting studs 76, and the lock nuts 77 therefor, in the valve body 78 are in this instance virtually similar to the corresponding portions in the valve body 16 of the valve 15, and their arrangement in the valve 70 is virtually the same as that of the corresponding portions in the valve 15.

The principal difference between the valve 70 and the valve 15 lies in the construction and arrangement in the valve 70 of the housing 79, which corresponds to the housing 53 in the valve 15. In the valve 70 the housing 79 is not secured to the rotatable valve member 80, which corresponds to the rotatable valve member 43 in the valve 15 and has an adjusting stud 81 and a lock nut 82 therefor similar to the adjusting stud 46 and the lock nut 47 therefor in the valve 15, but the housing is rotatably mounted in the valve body independently of the valve member 80. For this purpose the valve body 78 has wings 83 formed in registration with each other on both sides of the valve body and beyond the valve member 80. Each wing terminates in a bearing 84, formed with an elongated opening 85. These openings are preferably arranged so that a median plane, drawn longitudinally through the openings, virtually coincides with the axis of the rotatable valve member 80.

The housing 79 has at its sides projections 86, so that the housing fits snugly and rotatably between the bearings. Studs 87, respectively screwed into the projections and arranged in alignment with each other, fit slidably in the respective openings 85. By this arrangement the studs serve as pivots for the rotatable movement of the housing 79 and also permit the latter to be slid towards or away from the valve member 80.

The mouth of the housing 79 is convexly surfaced, as shown at 88, and is coaxial with the studs 87. This surface 88 fits a concave surface 89, formed on the valve body 78 at the outer end of the channel 72, and thereby permits the housing to rotate upon the studs and at the same time to form a fluid-tight connection with the valve body 78 when the housing is in registering position with the channel.

Each of the openings 85 merges into a chamber 90 at the side of the opening that is farthest from the base of the respective wing 83. A block 91 is mounted in each of the chambers 90 so that the block is adapted to slide to or from the stud 87 in the respective opening 85. One side of each block preferably fits the side of the respective stud 87, and an adjusting screw 92 is threaded into each bearing 84 so as to be adapted to engage the opposite side of the respective block 91 and thus to cause the blocks to engage the respective studs 87 with a pressure sufficient for holding the surfaces 88 and 89 in positive contact with each other when the housing 79 is in the aforementioned registering position. Preferably, in addition to fitting snugly between the bearings 84 on the wings 83, the housing also fits snugly between the wings at their bases, which for this purpose are formed with inward projections 93, while corresponding outward projections 94 are formed on the housing at its mouth, so that the projections 93 and 94 serve as auxiliary means for guiding the housing into registering position with the channel 72.

Like the valve member 43 in the valve 15, the valve member 80 has also a longitudinal slot 95 therein in order to allow the valve member 74 to be slid therethrough when the valve member 80 is in its open position. The valve member 74, which may be without an orifice for fluid to flow through or may be provided with an orifice for this purpose, as indicated by dot-and-dash lines in Fig. 11, is otherwise preferably constructed so that, when it is in its flow-obstructing position in the channel 72, as shown in full lines in Figs. 10 and 11, it allows the closing of the valve member 80, which preferably has a squared projection 96 at its wide end in order to facilitate the turning of the valve member.

Opposite to its mouth the housing 79 terminates in a neck 97 similar to the neck 62 on the housing 53, and similarly provided with a packing 98 and a gland 99 therein, and with a cap 100 thereon. A rod 101, corresponding to the operating rod 61 for the valve member 25, is in this instance shown as extending through the neck and the cap and as having therethrough, near to its outer end, an opening 102 for receiving loosely therein an operating handle 103, and also as having, near to its inner end, a pin 104 therethrough. Correspondingly, the valve member 74 has therein towards the housing 79 a central bore into which the inner end of the rod 101 fits. The bore is bounded at its side by a wall in which are formed, diametrically opposite to each other, two bayonet slots 105, so that, when the inner end portion of the rod is inserted in the bore and when the pin 104 engages the respective terminal portions of the bayonet slots, by merely a slight turning movement of the rod, the pin will engage the cross portions of the bayonet slots.

In this manner the rod is adapted to be quickly connected with the valve member 74 whenever it is required to slide the latter to or from its innermost position in the housing 79, as indicated by dot-and-dash lines in Fig. 11, or to or from its flow-obstructing position in the channel 72. Of course, by a reverse turning movement of the rod, the latter is just as quickly disengaged from the valve member 74.

A drainage opening 106, similar to the opening 69 in the valve 15, is also preferably formed in the valve 70.

During the operation of the valve 70, the rod 101 may be withdrawn into the housing 79, and the valve member 80 may be closed, so that no fluid can enter the housing from the fluid passage 71. In this case, however, it is not necessary to close the valve member 80, since fluid can not flow through the valve body, except through the fluid passage 71, so long as the housing 79 is in registering position with the channel 72. Whenever it is required to remove the valve member 74 from the valve body, the housing is first set in its registering position with the channel, the valve member 80 is opened, and the rod 101 is placed in engagement with the valve member 74, as before described, thereby enabling an operator to slide the latter valve member into the housing to the position indicated by dot-and-dash lines in Fig. 11. After this movement, the valve member 80 is closed so that no fluid can escape therethrough, and the housing is swung to the position indicated by dot-and-dash lines in Fig. 10. As is also suggested by dot-and-dash lines in Fig. 10, the valve 74 is then removed from the housing and is freed from its connection with the rod 101 in the manner already suggested.

From this description it is clear how the valve member 74, by a reversal of the steps for removing it from the valve body, is placed in its flow-obstructing position therein.

It is seen from the foregoing that both of the valves 15 and 70 are of a simple construction and can not easily get out of order. It is also obvious that the slidable valve members in the valves quickly and easily can be removed therefrom without necessitating the removal of any parts of the respective housings or any parts connected therewith. Thus, the time hitherto required for the slidable valve members to be inserted to operative position into, or to be removed from, valves of this type, is considerably lessened, and the cost of maintaining the valves of my invention in operative condition is therefore also considerably less than the maintenance cost of other valves of this character hitherto known in the art.

I claim as my invention:

1. A valve comprising a body provided with a passage for fluid therethrough and with a channel transverse to the fluid passage; a valve member mounted in the channel so as to be adapted to slide to and from a position for obstructing the flow of fluid through the passage and to be seated when it is in its flow-obstructing position; a valve member rotatably mounted in the valve body and provided with an opening so as to allow the slidable valve member to pass therethrough to and from its flow-obstructing position in the channel when the rotatable valve member is in its open position; a housing adapted to receive the slidable valve member therein and secured to the rotatable valve member so that the housing registers with the opening in the rotatable valve member and that thus the housing may be swung with the rotatable valve member to the open position of the rotatable valve member, thereby allowing the slidable valve member to be slid from the housing to its flow-obstructing position in the channel or to be slid from the flow-obstructing position into the housing, or that the housing may be swung with the rotatable valve member to the closed position of the rotatable valve member, thereby allowing the slidable valve member to be inserted into the housing from the outside of the valve body or to be removed from the valve body, which is formed so as to allow the rotative movement of the rotatable valve member with the housing thereon; and means for effecting the sliding movements of the slidable valve member.

2. A valve comprising a body provided with a passage for fluid therethrough and with a channel transverse to the fluid passage; a valve member mounted in the channel so as to be adapted to slide to and from a position for obstructing the flow of fluid through the passage and to be seated when it is in its flow-obstructing position; means for adjustably holding the valve member in engagement with its seat; a valve member rotatably mounted in the valve body and provided with an opening so as to allow the slidable valve member to pass therethrough to and from its flow-obstructing position in the channel when the rotatable valve member is in its open position; a housing adapted to receive the slidable valve member therein and secured to the rotatable valve member so that the housing registers with the opening in the rotatable valve member and that thus the housing may be swung with the rotatable valve member, thereby allowing the slidable valve member to be slid from the housing to its flow-obstructing position in the channel or to be slid from the flow-obstructing position into the housing, or that the housing may be swung with the rotatable valve member to the closed position of the rotatable valve member, thereby allowing the slidable valve member to be inserted into the housing from the outside of the valve body or to be removed from the valve body, which is formed so as to allow the rotative movement of the rotatable valve member with the housing thereon; and means for effecting the sliding movements of the slidable valve member.

3. A valve comprising a body provided with a passage for fluid therethrough and with a channel transverse to the fluid passage; a valve member mounted in the channel so as to be adapted to slide to and from a position for obstructing the flow of fluid through the passage and to be seated when it is in its flow-obstructing position; means for adjustably holding the valve member in engagement with its seat; means for locking the adjustable means; a valve member rotatably mounted in the valve body and provided with an opening so as to allow the slidable valve member to pass therethrough to and from its flow-obstructing position in the channel when the rotatable valve member is in its open position; a housing adapted to receive the slidable valve member therein and secured to the rotatable valve member so that the housing registers with the opening in the rotatable valve member and that thus the housing may be swung with the rotatable valve member to the open position of the rotatable valve member, thereby allowing the slidable valve member to be slid from the housing to its flow-obstructing position in the channel or to be slid from the flow-obstructing position into the housing, or that the housing may be swung with the rotatable valve member to the closed position of the rotatable valve member, thereby allowing the slidable valve member to be inserted into the housing from the outside of the valve body or to be removed from the valve body, which is formed so as to allow the rotative movement of the rotatable valve member with the housing thereon; and means for effecting the sliding movements of the slidable valve member.

4. A valve comprising a body provided with a passage for fluid therethrough and with a channel, which is transverse to the fluid passage and is provided with a seat portion; a valve member mounted in the channel so as to be adapted to slide to and from a position for obstructing the flow of fluid through the passage, one side of the valve member being adapted to engage the seat portion, and the other side of the valve member being provided with bevelled faces; wedges mounted in the valve body so as to be slidable transversely of the channel and the fluid passage and to be adapted to engage the bevelled faces of the valve member and thereby to cause the valve member to be in a fluid-tight engagement with the seat portion when the valve member is in its flow-obstructing position; a valve member rotatably mounted in the valve body and provided with an opening so as to allow the slidable valve member to pass therethrough to and from its flow-obstructing position in the channel when the rotatable valve member is in its open position; a housing adapted to receive the slidable valve member therein and secured to the rotatable valve member so that the housing registers with the opening in the rotatable valve member and that thus the housing may be swung with the rotatable valve member to the open position of the rotatable valve member, thereby allowing the slidable valve member to be slid from the housing to its flow-obstructing position in the channel or to be slid from the flow-obstructing position into the housing, or that the housing may be swung with the rotatable valve member to the closed position of the rotatable valve member, thereby allowing the slidable valve member to be inserted into the housing from the outside of the valve body or to be removed from the valve body, which is formed so as to allow the rotative movement of the rotatable valve member with the housing thereon; and means for effecting the sliding movements of the slidable valve member.

5. A valve comprising a body provided with a passage for fluid therethrough and with a channel, which is transverse to the fluid passage and is provided with a seat portion; a valve member mounted in the channel so as to be adapted to slide to and from a position for obstructing the flow of fluid through the passage, one side of the valve member being adapted to engage the seat portion, and the other side of the valve member being provided with bevelled faces; wedges mounted in the valve body so as to be slidable transversely of the channel and the fluid passage and to be adapted to engage the bevelled faces of the valve member and thereby to cause the valve member to be in a fluid-tight engagement with the seat portion when the valve member is in its flow-obstructing position; means for adjustably holding the wedges so as to cause the valve member to be in the fluid-tight engagement with the seat portion when the valve member is in its flow-obstructing position; means for locking the adjustable means; a valve member rotatably mounted in the valve body and provided with an opening so as to allow the slidable valve member to pass therethrough to and from its flow-obstructing position in the channel when the rotatable valve member is in its open position; a housing adapted to receive the slidable valve member therein and secured to the rotatable valve member so that the housing registers with the opening in the rotatable valve member and that thus the housing may be swung with the rotatable valve member to the open position of the rotatable valve member, thereby allowing the slidable valve member to be slid from the housing to its flow-obstructing position in the channel or to be slid from the flow-obstructing position into the housing, or that the housing may be swung with the rotatable valve member to the closed position of the rotatable valve member, thereby allowing the slidable valve member to be inserted into the housing from the outside of the valve body or to be removed from the valve body, which is formed so as to allow the rotative movement of the rotatable valve member with the housing thereon; and means for effecting the sliding movements of the slidable valve member.

6. A valve structure including a body having a fluid passage and a channel transverse to the said fluid passage, a valve member slidable in the channel and movable across the fluid passage, tiltable means for exposing the valve member exteriorly of the body and for withdrawing same from said channel, and means for closing communication between the passage and the exterior of the body when said sliding valve member is withdrawn from the passage.

7. A valve structure including a body having a fluid passage and a channel transverse to the said fluid passage, a valve member slidable in the channel and movable across the fluid passage, tiltable means for exposing the valve member exteriorly of the body and for withdrawing same from said channel, means for closing communication between the passage and the exterior of the body when said sliding valve member is withdrawn from the passage, the channel having a seat adapted to engage with one face of the sliding valve member, and means operable exteriorly of the body for moving the sliding valve member axially of the fluid passage and against said seat.

8. A valve structure including a body having a fluid passage and a channel transverse to the said fluid passage, a valve member slidable in the channel and movable across the fluid passage, tiltable means for exposing the valve member exteriorly of the body and for withdrawing same from said channel, means for closing communication between the passage and the exterior of the body when said sliding valve member is withdrawn from the passage, the channel having a seat adapted to engage with one face of the sliding valve member, and means operable exteriorly of the body for moving the sliding valve member axially of the fluid passage and against said seat, the slidable valve member including a manipulating stem movable axially of the channel.

9. A valve structure including a body having a fluid passage and a channel transverse to said fluid passage, a sliding valve member respectively movable into and out of the fluid passage and slidable in said channel, means exteriorly of the body and carried thereby for tiltably supporting the valve member so that same may be positioned at an angle to the channel and exteriorly exposed from the body, and means embodied in the first means and co-acting with the channel to close same with respect to the fluid passage when the sliding valve member is moved out of the passage.

10. A valve structure including a body having a fluid passage and a channel transverse to said fluid passage, a sliding valve member respectively movable into and out of the fluid passage and slidable in said channel, means exteriorly of the body and carried thereby for tiltably supporting the valve member so that same may be positioned at an angle to the channel and exteriorly exposed from the body, and rotary valve means embodied in the first means and co-acting with the channel to close same with respect to the fluid passage when the sliding valve member is moved out of the passage.

11. A valve structure including a body having a fluid passage and a channel transverse to said fluid passage, a sliding valve member respectively movable into and out of the fluid passage and slidable in said channel, means exteriorly of the body and carried thereby for tiltably supporting the valve member so that same may be positioned at an angle to the channel and exteriorly exposed from the body, and rotary valve means embodied in the first means and co-acting with the channel to close same with respect to the fluid passage when the sliding valve member is moved out of the passage, said rotary valve means having a slot through which the sliding valve member may move.

12. A valve structure including a body having a fluid passage, tilting means exteriorly of the body, the body having a channel extending between the tilting means and the fluid passage, a sliding valve member co-acting with the channel and adapted to extend across the fluid passage, and means for adjusting the sliding valve member out of the passage and for associating same with the tiltable means, whereby it may be exposed exteriorly of the valve body.

EDWARD P. REYNOLDS.